(12) United States Patent
Zhang et al.

(10) Patent No.: US 11,275,904 B2
(45) Date of Patent: Mar. 15, 2022

(54) METHOD AND APPARATUS FOR TRANSLATING POLYSEMY, AND MEDIUM

(71) Applicant: BEIJING BAIDU NETCOM SCIENCE AND TECHNOLOGY CO., LTD., Beijing (CN)

(72) Inventors: Ruiqing Zhang, Beijing (CN); Chuanqiang Zhang, Beijing (CN); Hao Xiong, Beijing (CN); Zhongjun He, Beijing (CN); Hua Wu, Beijing (CN); Zhi Li, Beijing (CN); Haifeng Wang, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 64 days.

(21) Appl. No.: 16/868,426

(22) Filed: May 6, 2020

(65) Prior Publication Data
US 2021/0192147 A1 Jun. 24, 2021

(30) Foreign Application Priority Data

Dec. 18, 2019 (CN) .......................... 201911309770.3

(51) Int. Cl.
*G06F 17/00* (2019.01)
*G06F 40/40* (2020.01)

(52) U.S. Cl.
CPC .................................... *G06F 40/40* (2020.01)

(58) Field of Classification Search
CPC ........... G06F 40/30; G06F 40/40; G06F 40/51
USPC ..................................................... 704/2, 277
See application file for complete search history.

(56) References Cited

U.S. PATENT DOCUMENTS

| 4,942,526 | A | * | 7/1990 | Okajima | ............... | G06F 40/289 |
| | | | | | | 704/10 |
| 5,285,386 | A | * | 2/1994 | Kuo | ........................ | G06F 40/55 |
| | | | | | | 704/2 |
| 5,416,696 | A | * | 5/1995 | Suzuoka | ............... | G06F 40/253 |
| | | | | | | 704/2 |
| 5,659,764 | A | * | 8/1997 | Sakiyama | ............... | G06F 3/017 |
| | | | | | | 340/4.13 |

(Continued)

FOREIGN PATENT DOCUMENTS

| CN | 104572633 A | 4/2015 |
| CN | 105718443 A | 6/2016 |

(Continued)

OTHER PUBLICATIONS

Chinese Patent Application No. 201911309770.3 English translation of Office Action dated Aug. 31, 2020, 7 pages.

(Continued)

*Primary Examiner* — Khai N. Nguyen
(74) *Attorney, Agent, or Firm* — Lathrop GPM LLP

(57) ABSTRACT

Embodiments of the present disclosure provide a method and an apparatus for translating a polysemy, and a medium. The method includes: obtaining a source language text; identifying and obtaining the polysemy from the source language text; inquiring related words corresponding to each interpretation of the polysemy; determining a target interpretation corresponding to the related words contained in the source language text; and translating the polysemy into the target interpretation.

12 Claims, 2 Drawing Sheets

(56) References Cited

U.S. PATENT DOCUMENTS

| | | | | |
|---|---|---|---|---|
| 5,844,798 | A * | 12/1998 | Uramoto | G06F 40/211 |
| | | | | 704/2 |
| 6,006,221 | A * | 12/1999 | Liddy | G06F 16/3337 |
| 6,189,002 | B1 * | 2/2001 | Roitblat | G06F 16/30 |
| 6,233,545 | B1 * | 5/2001 | Datig | G06N 3/004 |
| | | | | 704/2 |
| 7,765,098 | B2 * | 7/2010 | Bradford | G06F 40/42 |
| | | | | 704/9 |
| 7,822,768 | B2 * | 10/2010 | Maymir-Ducharme | |
| | | | | G06F 16/313 |
| | | | | 707/776 |
| 8,335,681 | B2 * | 12/2012 | Yin | G06F 40/45 |
| | | | | 704/4 |
| 9,201,957 | B2 * | 12/2015 | Turdakov | G06F 16/367 |
| 9,286,884 | B2 * | 3/2016 | Baker | G09B 21/007 |
| 10,929,618 | B2 * | 2/2021 | Ishikawa | G06F 40/242 |
| 2006/0009963 | A1 * | 1/2006 | Gaussier | G06F 40/45 |
| | | | | 704/7 |
| 2006/0112110 | A1 * | 5/2006 | Maymir-Ducharme | |
| | | | | G06F 16/313 |
| 2006/0265209 | A1 * | 11/2006 | Bradford | G06F 40/42 |
| | | | | 704/9 |
| 2007/0073678 | A1 * | 3/2007 | Scott | G06F 16/374 |
| 2007/0073745 | A1 * | 3/2007 | Scott | G06F 16/374 |
| 2007/0083359 | A1 * | 4/2007 | Bender | G06F 40/58 |
| | | | | 704/9 |
| 2008/0300856 | A1 * | 12/2008 | Kirk | G10L 15/26 |
| | | | | 704/4 |
| 2010/0057437 | A1 * | 3/2010 | Yin | G06F 40/289 |
| | | | | 704/4 |
| 2010/0106481 | A1 * | 4/2010 | Lo | G06F 40/129 |
| | | | | 704/2 |
| 2010/0268526 | A1 * | 10/2010 | Bradford | G06F 40/42 |
| | | | | 704/2 |
| 2012/0059708 | A1 * | 3/2012 | Galas | G06Q 30/0251 |
| | | | | 705/14.43 |
| 2012/0059713 | A1 * | 3/2012 | Galas | G06Q 30/0247 |
| | | | | 705/14.49 |
| 2012/0123784 | A1 * | 5/2012 | Baker | G09B 21/008 |
| | | | | 704/270 |
| 2013/0138696 | A1 * | 5/2013 | Turdakov | G06F 16/367 |
| | | | | 707/794 |
| 2016/0357731 | A1 * | 12/2016 | Zorzin | G06F 40/30 |
| 2019/0171718 | A1 * | 6/2019 | Ishikawa | G06F 16/338 |
| 2021/0192147 | A1 * | 6/2021 | Zhang | G06F 40/51 |

FOREIGN PATENT DOCUMENTS

| | | |
|---|---|---|
| CN | 108920467 A | 11/2018 |
| CN | 109726385 A | 5/2019 |
| JP | H0170875 A | 3/1989 |
| JP | H05242138 A | 9/1993 |
| JP | 2019012468 A | 1/2019 |
| WO | WO 2018110096 A1 | 6/2018 |

OTHER PUBLICATIONS

Chinese Patent Application No. 201911309770.3 Office Action dated Aug. 31, 2020, 7 pages.
Japanese Patent Application No. 2020-190963 Office Action dated Oct. 26, 2021, 3 pages.
Japanese Patent Application No. 2020-190963 English translation of Office Action dated Oct. 26, 2021, 3 pages.

* cited by examiner

METHOD AND APPARATUS FOR TRANSLATING POLYSEMY, AND MEDIUM

CROSS-REFERENCE TO RELATED APPLICATION

The present application is based upon and claims priority to Chinese Patent Application No. 201911309770.3, filed on Dec. 18, 2019, the entire contents of which are incorporated herein by reference.

TECHNICAL FIELD

The present disclosure relates to a field of translation technologies in a field of natural language processing technologies, and more particularly, to a method and an apparatus for translating a polysemy, and a medium.

BACKGROUND

With the rapid development of artificial intelligence, many types of translation machines have appeared in a field of translation, which has solved the problem of low efficiency of manual translation. Since a large number of vocabularies are polysemy, even for translators with a solid language and professional foundation for accurate translation of such vocabularies, omissions inevitably occur in the translation process.

In fact, when using translation machines to translate articles, there are errors in the translation of polysemy, resulting in a low accuracy of article translation.

SUMMARY

The present disclosure provides solutions for translating a polysemy.

Embodiments of the present disclosure provide a method for translating a polysemy. The method includes: obtaining a source language text; identifying and obtaining the polysemy from the source language text; inquiring related words corresponding to each interpretation of the polysemy; determining a target interpretation corresponding to the related words contained in the source language text; and translating the polysemy into the target interpretation.

Embodiments of the present disclosure provide an apparatus for translating a polysemy. The apparatus includes: one or more processors; a memory storing instructions executable by the one or more processors; in which the one or more processors are configured to: obtain a source language text; identify and obtain the polysemy from the source language text; inquire related words corresponding to each interpretation of the polysemy; determine a target interpretation corresponding to the related words contained in the source language text; and translate the polysemy into the target interpretation.

Embodiments of the present disclosure provide a non-transitory computer-readable storage medium storing computer instructions, when the computer instructions are executed, the computer is caused to implement a method for translating a polysemy, and the method includes: obtaining a source language text; identifying and obtaining the polysemy from the source language text; inquiring related words corresponding to each interpretation of the polysemy; determining a target interpretation corresponding to the related words contained in the source language text; and translating the polysemy into the target interpretation.

BRIEF DESCRIPTION OF THE DRAWINGS

The accompanying drawings are used to better understand the solution, and do not constitute a limitation on the disclosure, in which.

DETAILED DESCRIPTION

The following describes the exemplary embodiments of the present disclosure with reference to the accompanying drawings, which includes various details of the embodiments of the present disclosure to facilitate understanding, which shall be considered merely exemplary. Therefore, those of ordinary skill in the art should recognize that various changes and modifications can be made to the embodiments described herein without departing from the scope and spirit of the present disclosure. For clarity and conciseness, descriptions of well-known functions and structures are omitted in the following description.

In order to solve the technical problem of low translation accuracy when translating a polysemy in a text in the related art, this disclosure provides a method for translating a polysemy by obtaining a source language text, identifying and obtaining the polysemy from the source language text, inquiring related words corresponding to each interpretation of the polysemy, determining a target interpretation corresponding to the related words contained in the source language text, and translating the polysemy into the target interpretation.

A method and apparatus for translating a polysemy, an electronic device, and a medium according to an embodiment of the present disclosure are described below with reference to the accompanying drawings.

Figure 1:
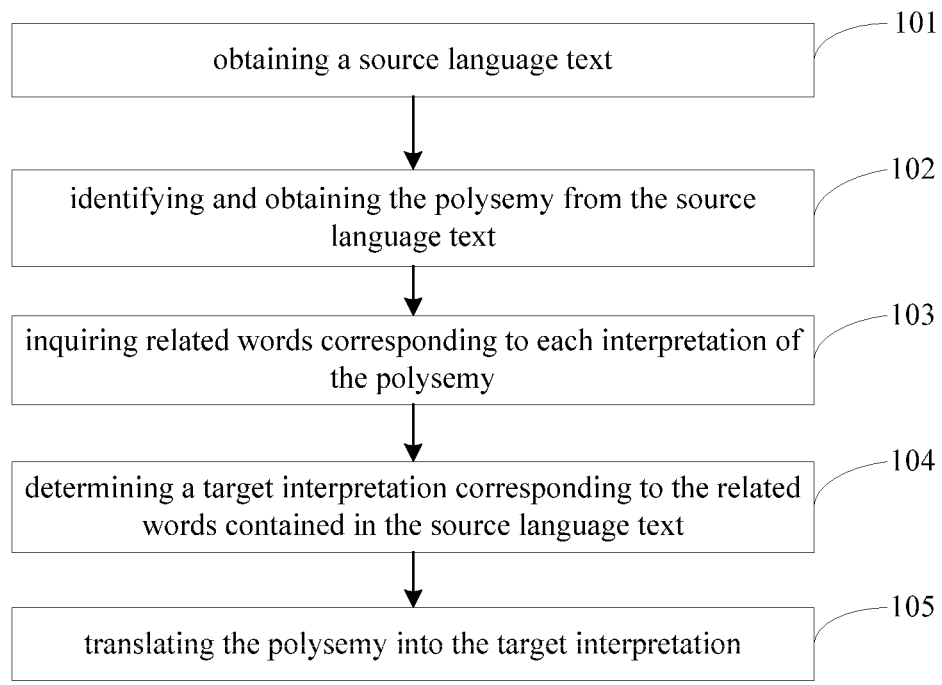
FIG. 1 is a flowchart of a method for translating a polysemy according to an embodiment of the present disclosure.

FIG. 1 is a flowchart of a method for translating a polysemy according to an embodiment of the present disclosure.

In the embodiments of the present disclosure, the method for translating the polysemy may be executed by the apparatus for translating the polysemy, and the apparatus for translating the polysemy is applicable to any electronic device, so that the electronic device can perform a polysemy translation function.

The electronic device may be a personal computer (PC), a cloud device, or a mobile device. The mobile device may be hardware devices with various operating system, such as a mobile phone, a tablet computer, a personal digital assistant, a wearable device, and an in-vehicle device.

As illustrated in FIG. 1, the method for translating a polysemy includes the following steps.

At step 101, a source language text is obtained.

In a possible case, the source language text may be a source language text input by a user, for example, a source language text input manually by the user, or a source language text input by voice, the manner in which the user inputs the source language text is not limited in the embodiments of the present disclosure.

In another possible case, the source language text may also be texts in an image, such as the texts contained in the image collected by the electronic device through the camera, or the text contained in the image downloaded from the server.

In the embodiments of the present disclosure, the source language text is the text to be translated, for example, the source language text is an English text or texts in other languages, which is not limited herein.

At step 102, the polysemy is identified and obtained from the source language text. Polysemy is a word with two or more meanings. For example, when the source language text is an English text, the word "shot" can be translated into "射击", "开枪", "镜头", "照片" and the like in Chinese.

In the embodiments of the present disclosure, after the source language text is obtained, the source language text may be identified to obtain the polysemy.

In a possible implementation, polysemy is identified from the source language text according to a polysemy library. In other words, the polysemy library is determined according to a polysemy probability indicating each word being polysemantic (i.e., the word has multiple interpretations), and when the polysemy probability is greater than a set threshold, the word is identified as a polysemy.

The polysemy probability includes a probability $P(e|T_i)$ that a word e is translated to each interpretation $T_i$, and a probability $P(T_i|e)$ that each interpretation $T_i$ is used as a translation of the word e, where i is a serial number of interpretations of the polysemy, which is a natural number ranging from 1 to n, and n is a total number of the interpretations of the polysemy.

In detail, a phrase list of the polysemy library is extracted first, and then the source language text is filtered according to the phrase list to obtain the polysemy. For example, the phrase list may be filtered according to a polysemy probability of a polysemy, to obtain polysemy with a polysemy probability greater than a set threshold.

It should be noted that, from the source language text, the number of the recognized polysemy is not limited to one, and all polysemys in the source language text can be identified.

At step 103, related words corresponding to each interpretation of the polysemy are inquired.

The related words refer to words having parallel concepts which are horizontally correlated, for example, "国庆 (the National Day)" and "10月1日 (October 1$^{st}$)" "电影 (movie)" and "镜头 (shot)".

In the embodiments of the present disclosure, after the polysemy is identified from the source language text, the related words corresponding to each interpretation of the polysemy are inquired in the corpus.

For example, the source language text is an English text, such as "A modern movie have something along the lines of three thousand shots. Each one of these shots are a few seconds long. But it would take designers the whole time of film making to create these shots". The polysemy recognized from the source language text is "shot", and the corresponding interpretations may be "射击", "开枪", "镜头", "照片", "射中" and the like. The relevant words corresponding to the interpretation of "镜头" can be "movie" or "film". The related words for the interpretations of "射击" and "开枪" can be "murder", "dead", "gun".

In a possible implementation, a target sample of the polysemy contained in an original text is determined from samples in a corpus, a plurality of candidate words according to words other than the polysemy are determined in the original text of the target sample, and a correlation degree of each interpretation is determined, the related words corresponding to the corresponding interpretation in the corpus are determined from the candidate words. Furthermore, the related words corresponding to each interpretation of the polysemy are inquired from the related words corresponding to the corresponding interpretations.

At step 104, a target interpretation corresponding to the related words contained in the source language text is determined.

The target interpretation is the corresponding interpretation of the polysemy in the source language text. For example, for the polysemy "shot", the corresponding interpretations may be "射击", "开枪", "镜头", "照片" "射中" and the like. According to the related words contained in the source language text, the corresponding target interpretation is determined as "镜头".

In the embodiments of the present disclosure, after determining the related words corresponding to each interpretation of the polysemy, the corresponding target interpretation is determined according to the related words contained in the source language text.

In detail, after determining the related words corresponding to each interpretation of the polysemy, the related words corresponding to each interpretation contained in the source language text are inquired, and it is determined that there is a related word corresponding to one of the interpretations in the source language text, and based on the related words contained in the source language text, the target interpretation of the polysemy is determined.

At step 105, the polysemy is translated into the target interpretation.

In the embodiments of the present disclosure, after determining the corresponding target interpretation according to the related words contained in the source language text, the polysemy is translated into the target interpretation.

In a possible implementation, when translating the entire source language text, after recognizing the polysemy and the related words corresponding to the interpretations from the source language text, the polysemy is translated into the target interpretation determined based on the related words contained in the source language text.

With the technical solution of the embodiments of the present disclosure, a source language text is obtained, the polysemy is identified and obtained from the source language text, related words corresponding to each interpretation of the polysemy are inquired, and a target interpretation corresponding to the related words contained in the source language text is determined, and the polysemy is translated into the target interpretation. This method translates the polysemy according to the related words corresponding to the interpretation of the polysemy contained in the source language text, and realizes the translation of the polysemy according to the context of the source language text, thereby ensuring that the polysemy can be translated correctly, and preventing occurrence of wrong interpretations.

Figure 2:
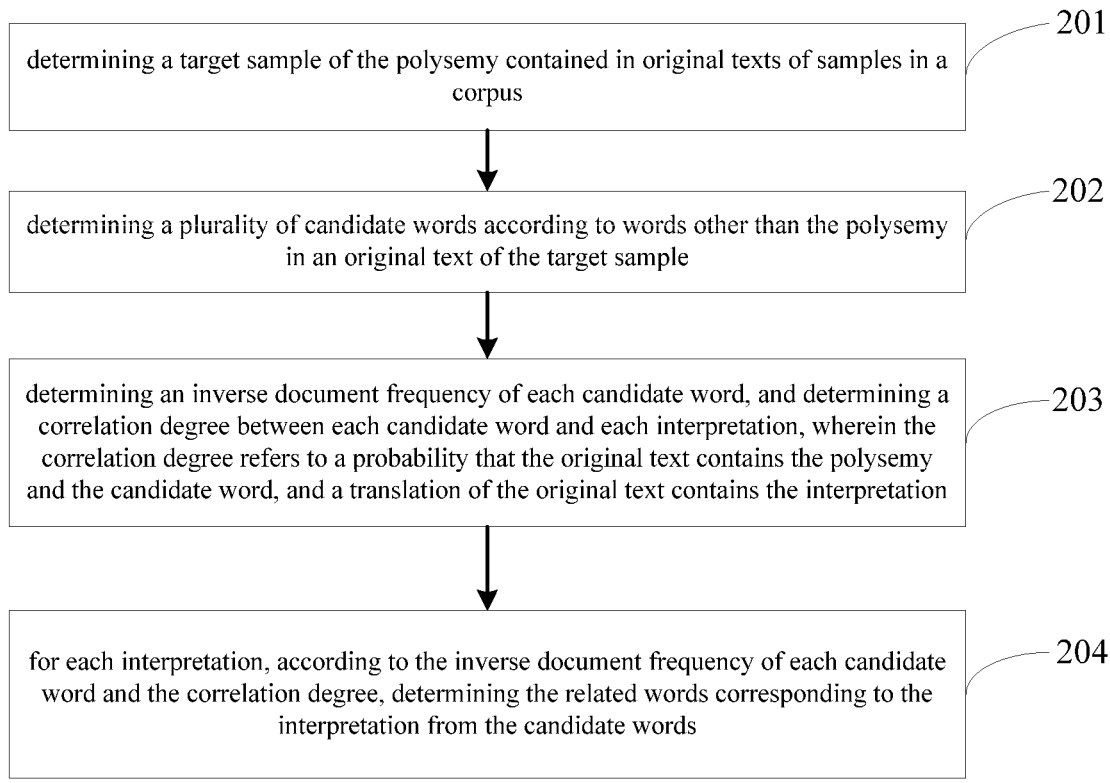
FIG. 2 is a flowchart of a method for translating a polysemy according to another embodiment of the present disclosure.

Based on the foregoing embodiments, before inquiring the related words corresponding to each interpretation of the polysemy at step 103, the related words corresponding to each interpretation are determined from the corpus. The above process will be described in detail below in combination with FIG. 2. FIG. 2 is a flowchart of another method for translating a polysemy according to an embodiment of the present disclosure.

As illustrated in FIG. 2, the translation method further includes the following steps.

At step 201, a target sample of the polysemy contained in original texts of samples in a corpus is determined.

The corpus stores language materials that have actually appeared in the actual use of language.

In the embodiments of the present disclosure, the corpus contains various text samples. After recognizing the polysemy from the source language text, it can be further determined from each sample in the corpus the target sample of which the original text includes the polysemy.

It is understood that a target sample refers to a sample of which the original text contains the polysemy in the corpus.

At step 202, a plurality of candidate words are determined according to words other than the polysemy in the original text of the target sample.

In the embodiments of the present disclosure, after a target sample containing the polysemy is determined from the corpus, a plurality of candidate words may be further determined according to words other than the polysemy in the original text of the target sample.

For example, there are 20 words in the original text of the target sample, one of which is a polysemy, and a plurality of candidate words are determined from the 19 words other than the polysemy in the target sample. For example, three candidate words may be determined.

At step 203, an inverse document frequency of each candidate word is determined, and a correlation degree of each interpretation is determined.

The correlation degree of each interpretation refers to a probability that the original text contains the polysemy and the candidate word and a translation of the original text contains the interpretation.

It is noted that term frequency-inverse document frequency (hereinafter referred to as TF-IDF) is a common weighting technique for information retrieval and exploration. TF-IDF is a statistical method used to evaluate the importance of a word to one of the documents in a document set or a corpus. The importance of a word increases proportionally with the number of times it appears in the document, but at the same time it decreases inversely with the frequency of its appearance in the corpus.

In the embodiments of the present disclosure, for each candidate word, the inverse document frequency of each candidate word is calculated.

In a possible implementation, for each candidate word, statistics is performed on the corpus to determine a number of samples of which the original text contains the candidate word and a total number of samples contained in the corpus. The inverse document frequency is determined according to a ratio of the total number of samples to the number of samples of which the original text contains the candidate word.

For example, for candidate word A, the total number of samples included in the corpus is 200,000, and the number of samples containing the candidate word A in the original texts of samples in the corpus is 10,000. The ratio of the number of samples to the number of samples containing the candidate word A is 200,000/10,000. Thus, the inverse document frequency IDF of the candidate word A can be determined as log (200000/10000), that is, IDF=log (200000/10000).

In the embodiments of the present disclosure, for each candidate word, the correlation degree between each candidate word and each interpretation is determined. In other words, the probability that the original text contains the polysemy and the candidate word, and the translation of the original text contains the interpretation is determined.

In a possible implementation, for each candidate word, statistics is performed on the corpus to determine a number $y_i$ of samples of which the original text contains the polysemy and the candidate word and a translation of the original text contains an interpretation $T_i$, in which i represents a serial number of interpretations of the polysemy, which is a natural number ranging from 1 to n, and n is the total number of the interpretations of the polysemy. Meanwhile, a number $Y_i$ of samples of which the original text contains the polysemy and the translation of the original text contains the interpretation $T_i$ is determined, and according to a ratio of the number $y_i$ to the number $Y_i$, the correlation degree between the candidate word and the interpretation $T_i$ is determined.

Further, for the above candidate word A, statistics is performed on the corpus to determine a number $y_i$ of samples of which the original text contains the polysemy B and the candidate word A and the translation of the original text contains an interpretation C is 150. A number $Y_i$ of samples of which the original text contains the polysemy B and the translation of the original text contains the interpretation C is 200. Therefore, the ratio of the number $y_i$ to the number $Y_i$ is 150/200. Furthermore, it can be determined that the correlation degree between the candidate word A and the interpretation C is 150/200.

It is noted that, for the plurality of candidate words determined from the target sample, the inverse document frequency of each candidate word and the correlation degree between the candidate word and the interpretation may be determined according to the above method.

At step 204, for each interpretation, according to the inverse document frequency of each candidate word and the correlation degree, the related words corresponding to the interpretation are determined from the candidate words.

In the embodiments of the present disclosure, for each candidate word, after determining the inverse document frequency of each candidate word and the correlation degree, the related words corresponding to the corresponding interpretation may be determined from the candidate words.

It is understood that the candidate words are filtered according to the inverse document frequency of each candidate word and the correlation degree, so as to select the candidate word with the highest inverse document frequency and the correlation degree as the related word of the interpretation.

With the technical solution of the embodiments of the present disclosure, a target sample of the polysemy contained in original texts of samples in a corpus is determined, a plurality of candidate words according to words other than the polysemy in an original text of the target sample is determined, an inverse document frequency of each candidate word is determined, and a correlation degree between each candidate word and each interpretation is determined, and for each interpretation, according to the inverse document frequency of each candidate word and the correlation degree, the related words corresponding to the interpretation are determined from the candidate words. Therefore, a plurality of candidate words are determined in the target sample containing the polysemy in the corpus, so as to determine related words corresponding to corresponding interpretation from the candidate words, so as to realize inner-sentence polysemy translation of the entire article, thereby improving the accuracy of polysemy translation.

Figure 3:
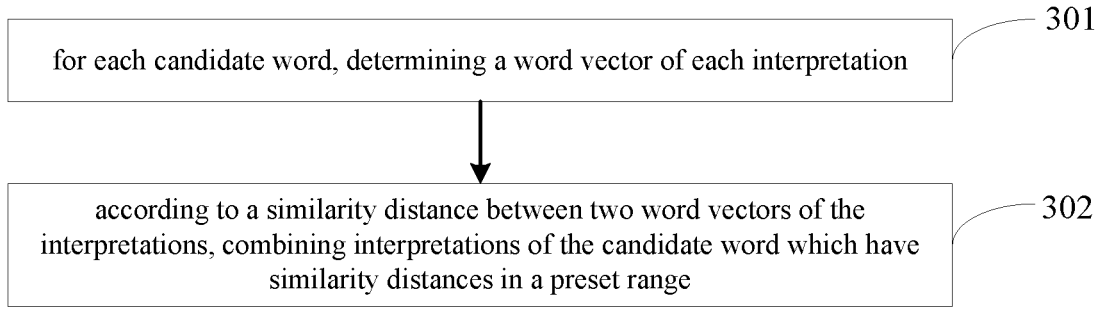
FIG. 3 is a flowchart of a method for translating a polysemy according to yet another embodiment of the present disclosure.

Based on the above embodiments, before determining the inverse document frequency of each candidate word, and determining the correlation degree between each candidate word and each interpretation at step 203, for each candidate word, a word vector of each interpretation is determined, and according to a similarity distance between two word vectors of the interpretations, interpretations of the corresponding candidate word are combined. Thus, by combining the interpretations of the polysemy, the rate of text translation can be increased. The above process will be described in detail below in combination with FIG. 3. FIG. 3 is a flowchart of yet another method for translating a polysemy according to an embodiment of the present disclosure.

As illustrated in FIG. 3, the method for translating a polysemy may include the following steps.

At step 301, for each candidate word, a word vector of each interpretation is determined.

Word vector (also called as, word embedding) is a collective name for a set of language modeling and feature learning techniques in natural language processing (NLP), in which words or phrases from the vocabulary are mapped to vectors of real numbers.

It is noted that for similar words, the corresponding word vectors are also similar.

In the embodiments of the present disclosure, after determining a plurality of candidate words from a target sample of which the original text contains the polysemy in the corpus, each candidate word corresponds to one or more interpretations of the polysemy. For each candidate word, the word vector of each interpretation is determined.

In a possible implementation, the word vector of each interpretation can be determined based on the language model method, specifically, each interpretation of each candidate word is input into a training neural network language model (NNLM), and the word vectors are incidental outputs of the language model.

At step 302, according to a similarity distance between two word vectors of the interpretations, interpretations of the candidate word which have similarity distances in a preset range are combined.

The similarity distance between the word vectors of each interpretation refers to the similarity between the interpretations.

For example, the similarity distance between the word vectors corresponding to the interpretations "射击" and "开枪" is greater than the similarity distance between "射击" and "镜头".

In the embodiments of the present disclosure, for each candidate word, after determining the word vector of each interpretation, the similarity distance between the word vectors of each interpretation is calculated, so as to combine the interpretations with the same or similar meaning.

In a possible implementation, a Euclidean distance calculation method which is used to calculate the word vector of each interpretation may be used to determine the similarity distance between the word vectors of the interpretations. For example, the following formula is used to calculate the similarity distance between the word vectors of the interpretations.

$$d = \sqrt{\sum_{i=1}^{N}(X_{1i} - X_{2i})},$$

where d represents the similarity distance between the word vectors of the interpretations, and $X_{1i}$ and $X_{2i}$ respectively represent the word vectors of the two interpretations.

In another possible implementation, the similarity distance between the word vector of the interpretation can also be evaluated by calculating cosine value of an angle between the word vectors of the interpretations.

The polysemy translation method according to the embodiment of the present disclosure determines the word vectors of each interpretation for each candidate word, and combines the interpretations of the corresponding candidate word according to the similarity distance between the word vectors of the interpretations. Thus, by combining the interpretations of the polysemy, the rate of text translation can be increased.

In order to implement the above embodiments, the present disclosure provides an apparatus for translating a polysemy.

Figure 4:
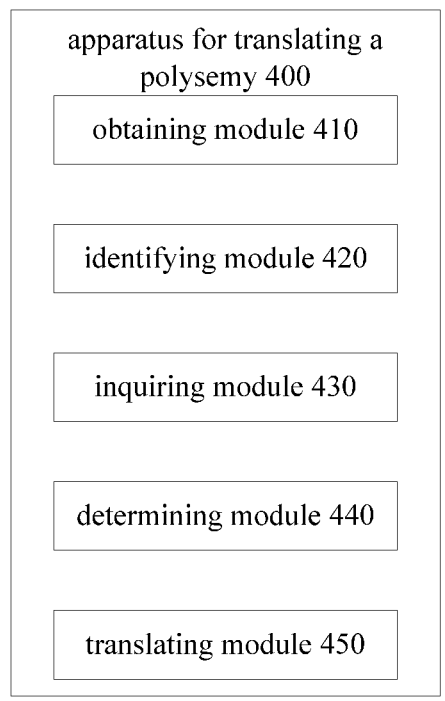
FIG. 4 is a structural diagram of an apparatus for translating a polysemy according to an embodiment of the present disclosure.

FIG. 4 is a structural diagram of an apparatus for translating a polysemy according to an embodiment of the present disclosure.

As illustrated in FIG. 4, the apparatus 400 for translating a polysemy includes: an obtaining module 410, an identifying module 420, an inquiring module 430, a determining module 440 and a translating module 450.

The obtaining module 410 is configured to obtain a source language text.

The identifying module 420 is configured to identify and obtain the polysemy from the source language text.

The inquiring module 430 is configured to inquire related words corresponding to each interpretation of the polysemy.

The determining module 440 is configured to determine a target interpretation corresponding to the related words contained in the source language text.

The translating module 450 is configured to translate the polysemy into the target interpretation.

In another possible implementation, the apparatus 400 for translating a polysemy includes: a sample processing module, configured to determine a target sample of the polysemy contained in original texts of samples in a corpus; a selecting module, configured to determine a plurality of candidate words according to words other than the polysemy in an original text of the target sample; a computing module, configured to determine an inverse document frequency of each candidate word, and determine a correlation degree between each candidate word and each interpretation, in which the correlation degree refers to a probability that the original text contains the polysemy and the candidate word, and a translation of the original text contains the interpretation; and an association module, configured to, for each interpretation, according to the inverse document frequency of each candidate word and the correlation degree, determine the related words corresponding to the interpretation from the candidate words.

In yet another possible implementation, the computing module is further configured to: for each candidate word, perform statistics on the corpus to determine a number yi of samples of which the original text contains the polysemy and the candidate word and a translation of the original text contains an interpretation Ti, where i represents a serial number of interpretations of the polysemy, which is a natural number ranging from 1 to n, and n is a total number of the interpretations of the polysemy; determine a number Yi of samples of which the original text contains the polysemy and the translation of the original text contains the interpretation Ti; and determine a ratio of the number yi to the number Yi as the correlation degree between the candidate word and the interpretation Ti.

In yet another possible implementation, the computing module is further configured to: for each candidate word, perform statistics on the corpus to determine a number of samples of which the original text contains the candidate word and a total number of samples contained in the corpus; and determine the inverse document frequency according to a ratio of the total number of samples to the number of samples of which the original text contains the candidate word.

In another possible implementation, the apparatus 400 for translating a polysemy includes: a word vector determination module, configured to, for each candidate word, determine a word vector of each interpretation; and a combination module, configured to, according to a similarity distance between two word vectors of the interpretations, combine interpretations of the candidate word which have similarity distances in a preset range.

In another possible implementation, the identifying module 420 is further configured to: identify the polysemy from the source language text according to a polysemy library; in which the polysemy library is determined according to a polysemy probability of each word, the polysemy probability of the polysemy is greater than a set threshold; and the polysemy probability comprises a probability P(e|Ti) that a word e is translated to each interpretation Ti, and a probability P (Ti|e) that each interpretation Ti is used as a translation of the word e, where i is a serial number of interpretations of the polysemy, which is a natural number ranging from 1 to n, and n is a total number of the interpretations of the polysemy.

It is noted that the foregoing explanation of the embodiment of the method for translating a polysemy is also applicable for the apparatus for translating a polysemy, which is not repeated herein.

With the apparatus for translating a polysemy, a source language text is obtained, the polysemy is identified and obtained from the source language text, related words corresponding to each interpretation of the polysemy are inquired, and a target interpretation corresponding to the related words contained in the source language text is determined, and the polysemy is translated into the target interpretation. This method translates the polysemy according to the related words corresponding to the interpretation of the polysemy contained in the source language text, and realizes the translation of the polysemy according to the context of the source language text, thereby ensuring that the polysemy can be translated correctly, and preventing occurrence of wrong interpretations.

In order to implement the above embodiments, the embodiments of the present disclosure provide an electronic device, the electronic device includes: at least one processor; and a memory connected in communication with the at least one processor; in which, the memory stores instructions executable by the at least one processor, when the instructions are executed by the at least one processor, the at least one processor are caused to implement the method for translating a polysemy according to the embodiments.

In order to implement the above embodiments, embodiments of the present disclosure provide a non-transitory computer-readable storage medium storing computer instructions, when the computer instructions are executed, the computer is caused to implement the method for translating a polysemy according to the embodiments.

According to the embodiments of the present disclosure, the present disclosure also provides an electronic device and a readable storage medium.

Figure 5:
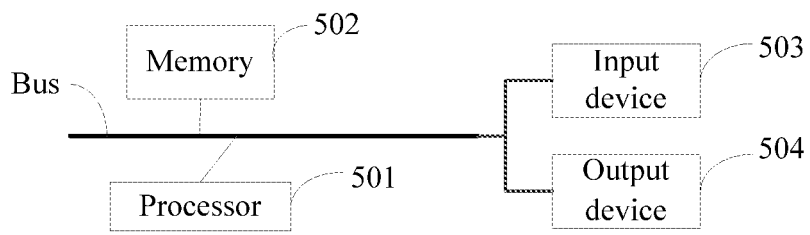
FIG. 5 is a block diagram of an electronic device for implementing a method for translating a polysemy according to an embodiment of the present disclosure.

FIG. 5 is a block diagram of an electronic device for implementing a method for translating a polysemy according to an embodiment of the present disclosure. Electronic devices are intended to represent various forms of digital computers, such as laptop computers, desktop computers, workbenches, personal digital assistants, servers, blade servers, mainframe computers, and other suitable computers. Electronic devices may also represent various forms of mobile devices, such as personal digital processing, cellular phones, smart phones, wearable devices, and other similar computing devices. The components shown here, their connections and relations, and their functions are merely examples, and are not intended to limit the implementation of the disclosure described and/or required herein.

As illustrated in FIG. 5, the electronic device includes: one or more processors 501, a memory 502, and interfaces for connecting various components, including a high-speed interface and a low-speed interface. The various components are interconnected using different buses and can be mounted on a common mainboard or otherwise installed as required. The processor may process instructions executed within the electronic device, including instructions stored in or on the memory to display graphical information of the GUI on an external input/output device such as a display device coupled to the interface. In other embodiments, a plurality of processors and/or buses can be used with a plurality of memories and processors, if desired. Similarly, a plurality of electronic devices can be connected, each providing some of the necessary operations (for example, as a server array, a group of blade servers, or a multiprocessor system). A processor 501 is taken as an example in FIG. 5.

The memory 502 is a non-transitory computer-readable storage medium according to the present disclosure. The memory stores instructions executable by at least one processor, so that the at least one processor executes the voice control method according to the present disclosure. The non-transitory computer-readable storage medium of the present disclosure stores computer instructions, which are used to cause a computer to execute the voice control method according to the present disclosure.

As a non-transitory computer-readable storage medium, the memory 502 is configured to store non-transitory software programs, non-transitory computer executable programs and modules, such as program instructions/modules corresponding to the voice skill creation method in the embodiment of the present disclosure (For example, the obtaining module 410, the identifying module 420, the inquiring module 430, the determining module 440, and the translating module 450 shown in FIG. 4). The processor 501 executes various functional applications and data processing of the server by running non-transitory software programs, instructions, and modules stored in the memory 502, that is, implementing the traffic scheme control method in the foregoing method embodiment.

The memory 502 may include a storage program area and a storage data area, where the storage program area may store an operating system and application programs required for at least one function. The storage data area may store data created according to the use of the electronic device, and the like. In addition, the memory 502 may include a high-speed random access memory, and a non-transitory memory, such as at least one magnetic disk storage device, a flash memory device, or other non-transitory solid-state storage device. In some embodiments, the memory 502 may optionally include a memory remotely disposed with respect to the processor 501, and these remote memories may be connected to the electronic device through a network.

Examples of the above network include, but are not limited to, the Internet, an intranet, a local area network, a mobile communication network, and combinations thereof.

The electronic device for implementing a method for translating a polysemy may further include an input device 503 and an output device 504. The processor 501, the memory 502, the input device 503, and the output device 504 may be connected through a bus or in other manners. In FIG. 5, the connection through the bus is taken as an example.

The input device 503 may receive inputted numeric or character information, and generate key signal inputs related to user settings and function control of an electronic device, such as a touch screen, a keypad, a mouse, a trackpad, a touchpad, an indication rod, one or more mouse buttons, trackballs, joysticks and other input devices. The output device 504 may include a display device, an auxiliary lighting device (for example, an LED), a haptic feedback device (for example, a vibration motor), and the like. The display device may include, but is not limited to, a liquid crystal display (LCD), a light emitting diode (LED) display, and a plasma display. In some embodiments, the display device may be a touch screen.

Various embodiments of the systems and technologies described herein may be implemented in digital electronic circuit systems, integrated circuit systems, application specific integrated circuits (ASICs), computer hardware, firmware, software, and/or combinations thereof. These various embodiments may be implemented in one or more computer programs, which may be executed and/or interpreted on a programmable system including at least one programmable processor. The programmable processor may be dedicated or general purpose programmable processor that receives data and instructions from a storage system, at least one input device, and at least one output device, and transmits the data and instructions to the storage system, the at least one input device, and the at least one output device.

These computing programs (also known as programs, software, software applications, or code) include machine instructions of a programmable processor and may utilize high-level processes and/or object-oriented programming languages, and/or assembly/machine languages to implement these calculation procedures. As used herein, the terms "machine-readable medium" and "computer-readable medium" refer to any computer program product, device, and/or device used to provide machine instructions and/or data to a programmable processor (for example, magnetic disks, optical disks, memories, programmable logic devices (PLDs), including machine-readable media that receive machine instructions as machine-readable signals. The term "machine-readable signal" refers to any signal used to provide machine instructions and/or data to a programmable processor.

In order to provide interaction with a user, the systems and techniques described herein may be implemented on a computer having a display device (e.g., a Cathode Ray Tube (CRT) or a Liquid Crystal Display (LCD) monitor for displaying information to a user); and a keyboard and pointing device (such as a mouse or trackball) through which the user can provide input to the computer. Other kinds of devices may also be used to provide interaction with the user. For example, the feedback provided to the user may be any form of sensory feedback (e.g., visual feedback, auditory feedback, or haptic feedback), and the input from the user may be received in any form (including acoustic input, voice input, or tactile input).

The systems and technologies described herein can be implemented in a computing system that includes background components (for example, a data server), or a computing system that includes middleware components (for example, an application server), or a computing system that includes front-end components (For example, a user computer with a graphical user interface or a web browser, through which the user can interact with the implementation of the systems and technologies described herein), or include such background components, intermediate computing components, or any combination of front-end components. The components of the system may be interconnected by any form or medium of digital data communication (egg, a communication network). Examples of communication networks include: local area network (LAN), wide area network (WAN), and the Internet.

The computer system may include a client and a server. The client and server are generally remote from each other and interacting through a communication network. The client-server relation is generated by computer programs running on the respective computers and having a client-server relation with each other.

With the technical solution of the embodiments of the present disclosure, a source language text is obtained, the polysemy is identified and obtained from the source language text, related words corresponding to each interpretation of the polysemy are inquired, and a target interpretation corresponding to the related words contained in the source language text is determined, and the polysemy is translated into the target interpretation. This method translates the polysemy according to the related words corresponding to the interpretation of the polysemy contained in the source language text, and realizes the translation of the polysemy according to the context of the source language text, thereby ensuring that the polysemy can be translated correctly, and preventing occurrence of wrong interpretations.

It should be understood that the various forms of processes shown above can be used to reorder, add, or delete steps. For example, the steps described in this application can be executed in parallel, sequentially, or in different orders, as long as the desired results of the technical solutions disclosed in this application can be achieved, which is no limited herein.

The foregoing specific implementations do not constitute a limitation on the protection scope of the present application. It should be understood by those skilled in the art that various modifications, combinations, sub-combinations, and substitutions may be made according to design requirements and other factors. Any modification, equivalent replacement and improvement made within the spirit and principle of this application shall be included in the protection scope of this application.

What is claimed is:

1. A method for translating a polysemy, comprising:
   obtaining a source language text;
   identifying and obtaining the polysemy from the source language text;
   inquiring related words corresponding to each interpretation of the polysemy;
   determining a target interpretation corresponding to the related words contained in the source language text; and
   translating the polysemy into the target interpretation,
   wherein identifying and obtaining the polysemy from the source language text comprises:
   identifying the polysemy from the source language text according to a polysemy library; wherein, the polysemy library is determined according to a polysemy probability of each word, the polysemy probability of the polysemy is greater than a set threshold; and the polysemy probability comprises a probability P(e|Ti) that a word e is translated to each interpretation Ti, and a probability P (Ti|e) that each interpretation Ti is used as a translation of the word e, where i is a serial number of interpretations of the polysemy, which is a natural number ranging from 1 to n, and n is a total number of the interpretations of the polysemy.

2. The method according to claim 1, before inquiring the related words corresponding to each interpretation of the polysemy, further comprising:

determining a target sample of the polysemy contained in original texts of samples in a corpus;

determining a plurality of candidate words according to words other than the polysemy in an original text of the target sample;

determining an inverse document frequency of each candidate word, and determining a correlation degree between each candidate word and each interpretation, wherein the correlation degree refers to a probability that the original text contains the polysemy and the candidate word, and a translation of the original text contains the interpretation; and for each interpretation, according to the inverse document frequency of each candidate word and the correlation degree, determining the related words corresponding to the interpretation from the candidate words.

3. The method according to claim 2, wherein determining the inverse document frequency of each candidate word, and determining the correlation degree between each candidate word and each interpretation, comprises:

for each candidate word, performing statistics on the corpus to determine a number yi of samples of which the original text contains the polysemy and the candidate word and a translation of the original text contains an interpretation Ti, where i represents a serial number of interpretations of the polysemy, which is a natural number ranging from 1 to n, and n is a total number of the interpretations of the polysemy;

determining a number Yi of samples of which the original text contains the polysemy and the translation of the original text contains the interpretation Ti; and determining a ratio of the number yi to the number Yi as the correlation degree between the candidate word and the interpretation Ti.

4. The method according to claim 3, wherein identifying and obtaining the polysemy from the source language text comprises:

identifying the polysemy from the source language text according to a polysemy library; wherein, the polysemy library is determined according to a polysemy probability of each word, the polysemy probability of the polysemy is greater than a set threshold; and the polysemy probability comprises a probability P(e|Ti) that a word e is translated to each interpretation Ti, and a probability P (Ti|e) that each interpretation Ti is used as a translation of the word e, where i is a serial number of interpretations of the polysemy, which is a natural number ranging from 1 to n, and n is a total number of the interpretations of the polysemy.

5. The method according to claim 2, wherein determining the inverse document frequency of each candidate word, and determining the correlation degree between each candidate word and each interpretation, comprises:

for each candidate word, performing statistics on the corpus to determine a number of samples of which the original text contains the candidate word and a total number of samples contained in the corpus; and determining the inverse document frequency according to a ratio of the total number of samples to the number of samples of which the original text contains the candidate word.

6. The method according to claim 5, wherein identifying and obtaining the polysemy from the source language text comprises:

identifying the polysemy from the source language text according to a polysemy library; wherein, the polysemy library is determined according to a polysemy probability of each word, the polysemy probability of the polysemy is greater than a set threshold; and the polysemy probability comprises a probability P(e|Ti) that a word e is translated to each interpretation Ti, and a probability P (Ti|e) that each interpretation Ti is used as a translation of the word e, where i is a serial number of interpretations of the polysemy, which is a natural number ranging from 1 to n, and n is a total number of the interpretations of the polysemy.

7. The method according to claim 2, before determining the inverse document frequency of each candidate word, and determining the correlation degree between each candidate word and each interpretation, comprising:

for each candidate word, determining a word vector of each interpretation; and according to a similarity distance between two word vectors of the interpretations, combining interpretations of the candidate word which have similarity distances in a preset range.

8. The method according to claim 7, wherein identifying and obtaining the polysemy from the source language text comprises:

identifying the polysemy from the source language text according to a polysemy library; wherein, the polysemy library is determined according to a polysemy probability of each word, the polysemy probability of the polysemy is greater than a set threshold; and the polysemy probability comprises a probability P(e|Ti) that a word e is translated to each interpretation Ti, and a probability P (Ti|e) that each interpretation Ti is used as a translation of the word e, where i is a serial number of interpretations of the polysemy, which is a natural number ranging from 1 to n, and n is a total number of the interpretations of the polysemy.

9. The method according to claim 2, wherein identifying and obtaining the polysemy from the source language text comprises:

identifying the polysemy from the source language text according to a polysemy library; wherein, the polysemy library is determined according to a polysemy probability of each word, the polysemy probability of the polysemy is greater than a set threshold; and the polysemy probability comprises a probability P(e|Ti) that a word e is translated to each interpretation Ti, and a probability P (Ti|e) that each interpretation Ti is used as a translation of the word e, where i is a serial number of interpretations of the polysemy, which is a natural number ranging from 1 to n, and n is a total number of the interpretations of the polysemy.

10. An apparatus for translating a polysemy, comprising:
one or more processors;
a memory storing instructions executable by the one or more processors;

wherein the one or more processors are configured to:

obtain a source language text;

identify and obtain the polysemy from the source language text;

inquire related words corresponding to each interpretation of the polysemy;

determine a target interpretation corresponding to the related words contained in the source language text; and translate the polysemy into the target interpretation, wherein the one or more processors are further configured to:

identify the polysemy from the source language text according to a polysemy library; wherein, the polysemy library is determined according to a polysemy probability of each word, the polysemy probability of the polysemy is greater than a set threshold; and the polysemy probability comprises a probability P(e|Ti) that a word e is translated to each interpretation Ti, and a probability P (Ti|e) that each interpretation Ti is used as a translation of the word e, where i is a serial number of interpretations of the polysemy, which is a natural number ranging from 1 to n, and n is a total number of the interpretations of the polysemy.

11. The apparatus according to claim 10, wherein the one or more processors are configured to:

determine a target sample of the polysemy contained in original texts of samples in a corpus;

determine a plurality of candidate words according to words other than the polysemy in an original text of the target sample;

determine an inverse document frequency of each candidate word, and determine a correlation degree between each candidate word and each interpretation, wherein the correlation degree refers to a probability that the original text contains the polysemy and the candidate word, and a translation of the original text contains the interpretation; and for each interpretation, according to the inverse document frequency of each candidate word and the correlation degree, determine the related words corresponding to the interpretation from the candidate words.

12. A non-transitory computer-readable storage medium storing computer instructions, wherein when the computer instructions are executed, the computer is caused to implement a method for translating a polysemy, and the method comprises:

obtaining a source language text;

identifying and obtaining the polysemy from the source language text;

inquiring related words corresponding to each interpretation of the polysemy;

determining a target interpretation corresponding to the related words contained in the source language text; and translating the polysemy into the target interpretation, wherein identifying and obtaining the polysemy from the source language text comprises:

identifying the polysemy from the source language text according to a polysemy library; wherein, the polysemy library is determined according to a polysemy probability of each word, the polysemy probability of the polysemy is greater than a set threshold; and the polysemy probability comprises a probability P(e|Ti) that a word e is translated to each interpretation Ti, and a probability P (Ti|e) that each interpretation Ti is used as a translation of the word e, where i is a serial number of interpretations of the polysemy, which is a natural number ranging from 1 to n, and n is a total number of the interpretations of the polysemy.

\* \* \* \* \*